USO05259687A

United States Patent [19]
John

[11] Patent Number: 5,259,687
[45] Date of Patent: Nov. 9, 1993

[54] MODULAR VALANCE ASSEMBLY

[75] Inventor: Julius F. John, Redondo Beach, Calif.

[73] Assignee: Home Fashions, Inc., Santa Monica, Calif.

[21] Appl. No.: 704,344

[22] Filed: May 23, 1991

[51] Int. Cl.⁵ .............................................. F16B 7/00
[52] U.S. Cl. ................................. 403/295; 403/403; 160/38
[58] Field of Search .............. 160/38, 19; 5/493; 403/403, 402, 295, 382, 205

[56] References Cited

U.S. PATENT DOCUMENTS

| | | | |
|---|---|---|---|
| 3,007,036 | 10/1961 | Mills, Jr. | 160/38 X |
| 4,099,815 | 7/1978 | Cox et al. | 403/295 X |
| 4,662,421 | 5/1987 | Basmadji et al. | 160/38 |
| 4,828,002 | 5/1989 | Ashby | 160/38 |
| 4,839,974 | 6/1989 | Walter | 403/402 X |
| 4,870,711 | 10/1989 | Felix | 403/403 X |
| 4,921,031 | 5/1990 | Wagner et al. | 160/38 |
| 4,993,866 | 2/1991 | Sugihara et al. | 403/403 X |
| 5,011,323 | 4/1991 | Liuo | 403/402 X |
| 5,042,548 | 8/1991 | Attal | 160/38 |
| 5,090,836 | 2/1992 | Hwang et al. | 403/295 |

Primary Examiner—Blair M. Johnson
Attorney, Agent, or Firm—Wallenstein Wagner & Hattis, Ltd.

[57] ABSTRACT

A modular valance assembly (10) is disclosed that is both easy to assemble and to disassemble. The assembly (10) includes a front valance member (20b) interconnected at each side (21) to a side valance member (20a) by a corner member (40) disposed therebetween. The valance members (20) include, near their top edge (23), a rearwardly-extending mounting flange (27) with a projecting rib (31) and, adjacent their bottom edge (24), a frontwardly-extending cantilevered portion (32). The corner member (40) includes means for connecting (43,44) the top part of each valance member (20) and means for being connected (55) to the bottom part of the each valance member (20). The corner member (40) is arcuate (41) so as to hold the interconnected valance members (20) at right angles to one another.

Second (140) and third embodiments (240) of the corner members that are not arcuate are also disclosed for interconnecting, in perpendicular relation, a front valance member (20) with a mounting flange (27) to a side valance member (120) without such a flange.

7 Claims, 5 Drawing Sheets

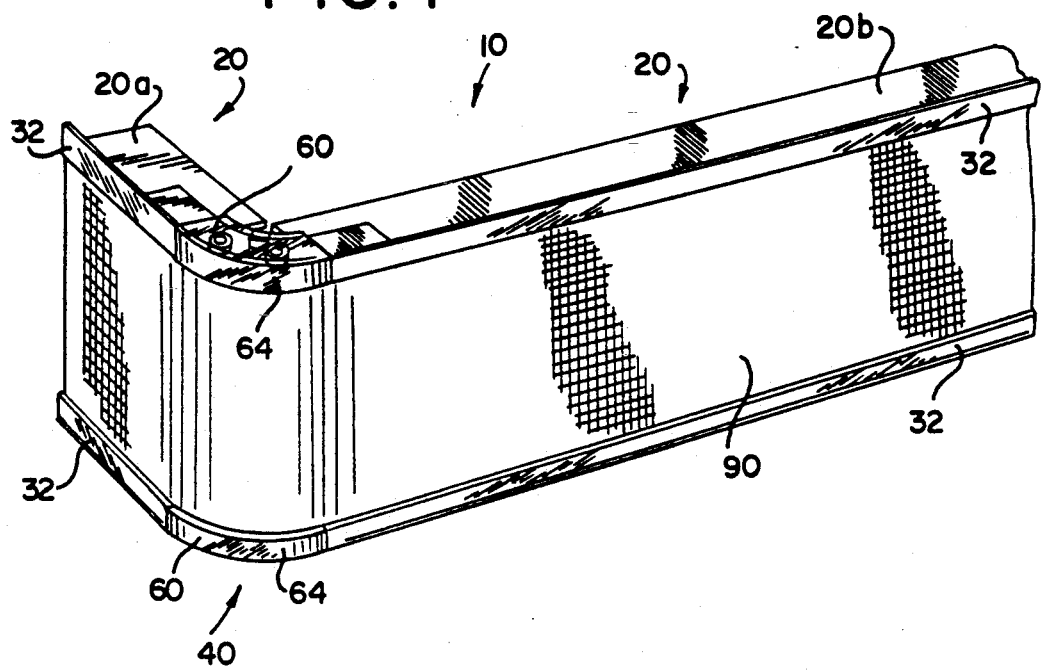
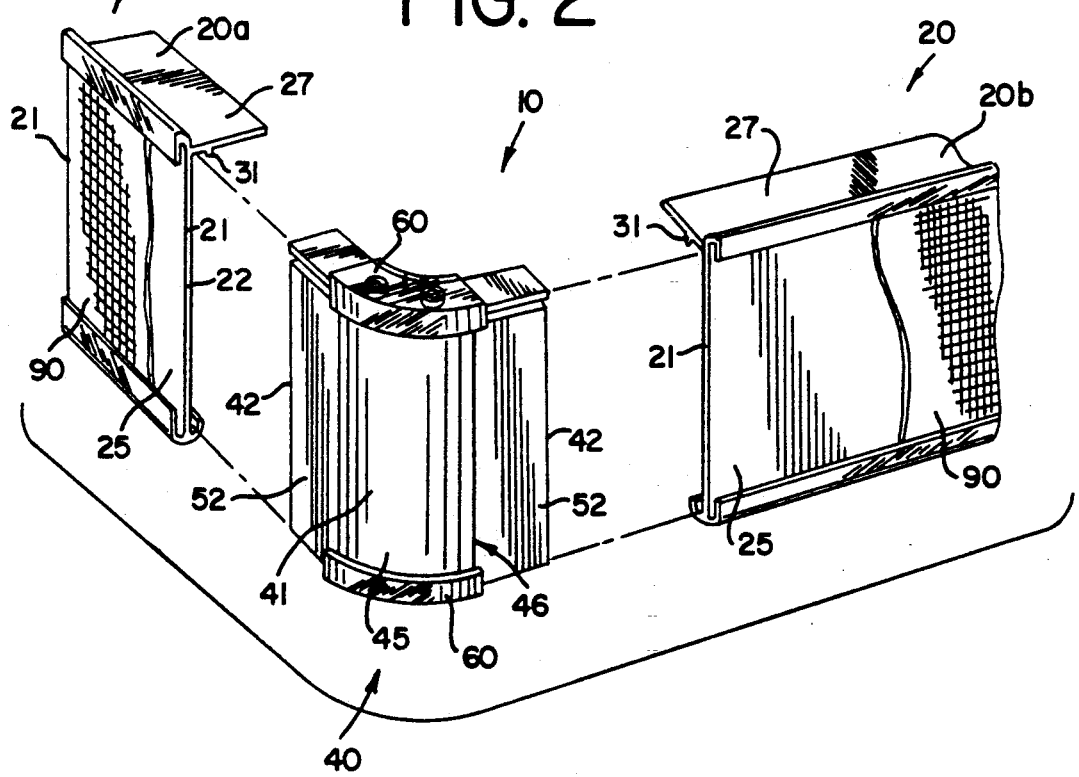

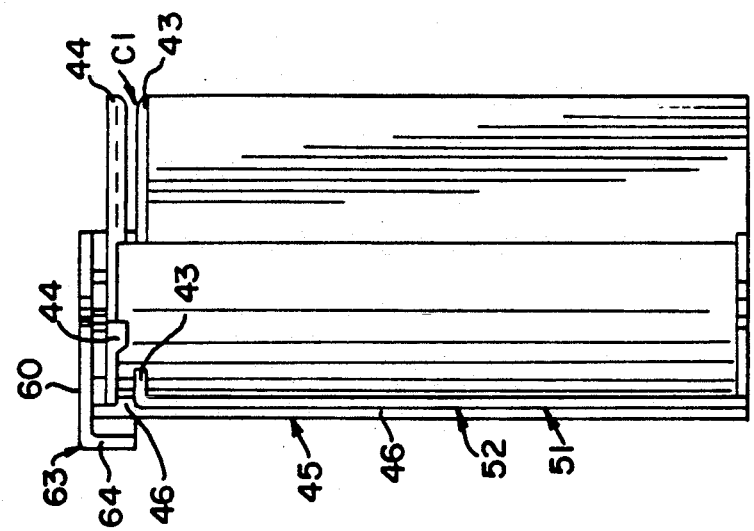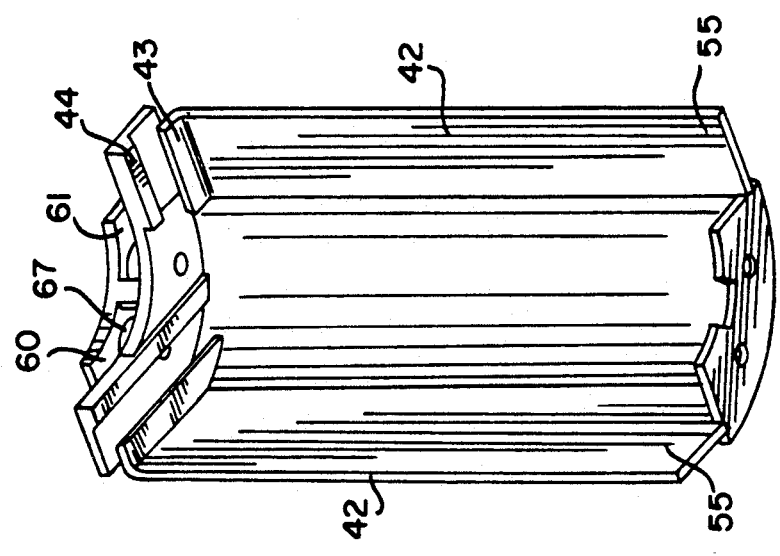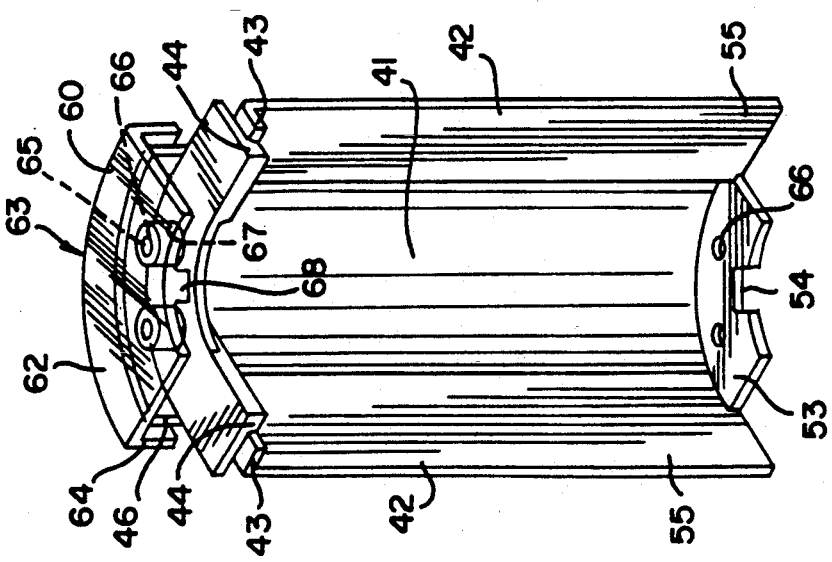

MODULAR VALANCE ASSEMBLY

TECHNICAL FIELD OF THE INVENTION

The present invention relates to decorative fixtures for use with window coverings and, more particularly, to a modular valance assembly for enclosing and ornamenting the headrail used in conjunction with horizontal and vertical venetian blinds.

BACKGROUND OF THE INVENTION

Today, there are a variety of blinds available in the market to cover windows or to partition spaces Generally, such venetian blinds have a headrail or a channel support that both supports the blinds and conceals the mechanisms that effectuate the raising, the lowering and the tilting of the louvers or slats. An example of such a mechanism for vertical blinds is disclosed in U.S. Pat. No. 4,834,162, entitled VERTICAL LOUVER BLIND OPERATING MECHANISM and assigned to the Assignee of the present invention, HOME FASHIONS, INC. of Santa Monica, California.

Often times the headrail is itself plain and it is desirous to cover it with a permanent valance assembly or cornice. This cornice or valance assembly is usually attached to the headrail or to the wall supporting the headrail.

The prior art is replete with such cornices and valance assemblies. For example, such systems are disclosed in U.S. Pat. Nos. 4,935,988, 4,921,031, 4,384,605, 3,111,162, 2,640,533, 2,616,495, 2,604,155, 2,526,806, and 91,441 and French Patent No. 2.222.525. A further cornice is disclosed in U.S. Pat. No. 4,828,002, entitled WINDOW COVERING HEADRAIL CORNICE, also assigned to HOME FASHIONS, INC.

In designing a valance assembly, many diverse considerations must be taken into account. For example, of primary concern is that the valance assembly must be easy to assemble and disassemble for a consumer, both during the initial mounting and during cleaning or maintenance. People unskilled in the construction art must be able to do these tasks without any concern or hesitancy. To this end, the attachments and components of the assembly cannot be too complicated. In a modular system, a minimum number of parts is both preferred and desired. Interchangeable parts can also simplify the assembly of the components and significantly reduce the manufacturing costs. Further, the connections for the parts need to be simple, non-hazardous and uncomplicated. In addition, to comfortably put the system together and take it apart, it is advantageous to make the assembly so that it can be assembled and disassembled without the need for tools. Also, it must be strong so that it can withstand moves and any accidental dislodging And finally, the assembly must be pleasing to viewers from all angles in front of and to the side of it.

SUMMARY OF THE INVENTION

A valance assembly is disclosed that includes a front elongated valance member and two side elongated valance members The front valance member is releasably connected to each of the side valance members by a corner member disposed and interconnected therebetween. In particular, three embodiments of the corner members and two types of valance members are disclosed and discussed herein. The front valance member, being one of the two types of valance members, comprises a vertical portion with a top edge, a bottom edge, a front surface and a rear surface The rear surface includes an integral, substantially horizontal mounting flange that is spaced from and substantially parallel to the top edge. The mounting flange has a raised rib projecting downwardly from its lower surface extending along substantially the full length of the flange in a parallel, spaced relation to the rear surface. There is also a cantilevered portion projecting rearwardly from the bottom edge so as to form a channel adjacent this rear surface Preferably, the valance member additionally has a front surface that is generally planar with cantilevered channel forming portions contiguous with both the top and the bottom for receiving and maintaining a cover or decorative panel in the formed channels. Accordingly, the decorative panel is held generally adjacent and parallel to the front surface of the valance member. The side cornice members, also called return valance members, can be either like the front cornice member, as just described, or a similar design that is without the mounting flange and rib.

Each interconnected corner member has connecting means adjacent both its ends for gripping an end of a valance member. With respect to gripping a valance of the type having a mounting flange and a rib, the connecting means comprises upper and lower substantially parallel connector flanges that define a channel between them for receiving the end of the mounting flange. The upper flange biases the mounting flange to urge it against the lower flange which frictionally engages and cooperates with both the rib and the lower surface of the mounting flange so as to capture the top portion of the valance member. In addition, the bottom edge of the corner member is slidably received in the channel formed adjacent the rear surface of the valance member. Thus, the corner member and the valance member are interlocked both at their tops and at their bottoms.

The corner member of the first embodiment is generally arcuate and interconnects two valance members of the type with the rearwardly projecting mounting flange and downwardly projecting rib. This corner member has a generally arcuate portion of about 90° with a first front surface terminating at marginal ledges that have offset portions with top edges and bottom edges and with second front surfaces so as to permit the front surfaces of the valance members connected thereto to be flush and planar with the front surface. In this embodiment the connector flanges are substantially parallel to each other and are generally perpendicular to the planes of the two front surfaces. In addition, both an upper cap and a lower cap are provided for connecting to the upper edge and the lower edge of the corner member.

As for a corner member that interconnects a front valance member of the type with the mounting flange and side members of the second type, without the mounting flange, two embodiments are disclosed. Each such embodiment releasably grips the front valance by similarly designed upper and lower connector flanges. Two pairs of connector flanges are provided so as to make the corner member interchangeable, i.e., it can be connected to either the left side or the right side of the front valance member. Thus, the upper flange is S-shaped so as to have an extension portion that is held in the channel formed by the cantilevered portion extending rearwardly of the bottom edge of the valance member. The lower extension is held while the upper pair of connector flanges is engaging the mounting flange.

And, the upper extension is held while the lower pair of connector flanges is engaging the mounting flange. In this manner, both the top and the bottom of the corner member are interlocked to the valance member.

The means for holding the side valance members is a face plate with the connector flanges projecting outwardly from one side surface and cantilevered portions projecting outwardly from the opposed side surface forming opposed channels for slidably receiving the side valance.

Other advantages and aspects of the invention will become apparent upon making reference to the specification, claims, and drawings to follow.

BRIEF DESCRIPTION OF THE DRAWINGS

FIG. 1 is a perspective view of a portion of a valance assembly made in accordance with the teachings of the present invention;

FIG. 2 is an exploded perspective view of the valance assembly shown in FIG. 1;

FIG. 4 is a rear perspective view of a corner member made in accordance with the teachings of the present invention and shown in FIGS. 1 and 2;

FIG. 5 is a another rear perspective view of the corner member shown in FIG. 4;

FIG. 6 is an end view of the corner member shown in FIGS. 4 and 5;

DETAILED DESCRIPTION OF THE INVENTION

Figure 3:
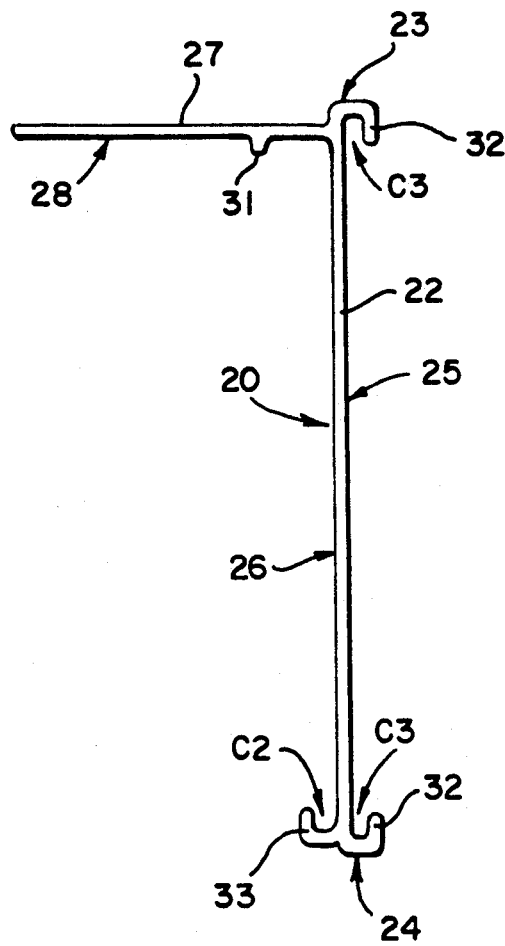
FIG. 3 is an end view of the valance member shown in FIGS. 1 and 2.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 of the drawings shows a portion of a valance assembly, generally designated by the reference number 10. The valance assembly includes three valance members 20 that are interconnected by two corner members 40. Typically, two of the valance members 20a form the sides of the assembly 10 and one valance member 20b forms the front of the assembly. The details of mounting the valance assembly 10 to a headrail (not shown) and a wall (also not shown) are disclosed in detail in U.S. Pat. No. 4,840,216, entitled VALANCE BRACKET FOR A VERTICAL BLIND and U.S. Pat. No. 4,957,255, entitled VALANCE SUPPORT BRACKET, both assigned to the Assignee, HOME FASHIONS, INC., Santa Monica, California, of the present invention. A portion of the front valance member 20b, a portion of a side valance member 20a and a corner member 40 interconnected therebetween are shown in FIG. 1. The front end 21 of the side valance member 20a is connected to an end 42 of a corner piece 40 that is, in turn, connected at the other end 42 to an end 21 of the front valance member 20b. The other end of the front valance member 20b (not shown) is connected to the end of a separate corner member (not shown) that is, in turn, connected to the other side valance member (not shown). An uncoupled portion of the assembly in an exploded format is detailed in FIG. 2.

Turning to both FIG. 2 and FIG. 3, a valance member is shown. The valance member 20 has opposite ends 21 and a vertical portion 22. This vertical portion 22 includes a top edge 23, a bottom edge 24, a front surface 25 and a rear surface 26. The front surface 25 is generally planar. While the rear surface 26 is also generally planar, there is a substantially horizontal mounting flange 27 integral with and projecting outwardly from it. Preferably, this mounting flange 27 is substantially perpendicular to the rear surface 26 of the valance member 20. Also, this mounting flange 27 is spaced from and substantially parallel to the valance top edge 23.

A raised rib 31 projects downwardly from the lower surface 28 of the mounting flange 27 and extends along substantially the full length of the horizontal mounting flange. This rib 31 runs substantially parallel to and is spaced from the rear surface 26 of the vertical portion 22.

The front surface 25 of the vertical portion 22 may be itself decorative or it may, preferably, have cantilevered portions 32 contiguous with both the top edge 23 and the bottom edge 24 for receiving and maintaining a cover or decorative panel 90 therebetween in the channels C3 formed. The decorative panel 90 can be slid into the channels C3 formed by the cantilevered portions 32 so as to be held generally adjacent and parallel to the front surface 25 of the valance member 20.

The rear surface 26 also has a cantilevered portion 33 contiguous with the bottom edge 24 for gripping a portion of the corner member 40. These cantilevered portions 32,33 not only perform the above described functions, but also provide a nice, smooth and safe upper and lower edge to the valance assembly 10.

Referring back to FIGS. 1 and 2, the valance assembly 10 has a front elongated valance member 20b, two side, or alternatively return, elongated valance members 20a and a pair of corner members 40, each mounted to an end of the 20b and to one end 42 of a return valance member 20a. Each of the corner members 40 couples with and interlocks two valance members 20 in an angled relation to one another. The corner member 40 is arcuate in shape and has opposite ends 42 with connection means thereon to releasably connect the valance members 20 such that they are substantially perpendicular to each other.

Specifically, the corner member 40 is constructed to have connecting means adjacent each of its ends 42 that cooperate with and releasable interlock with an end 21 of the mounting flange 27 and the raised rib 31 projecting downwardly from the bottom surface 28 of the mounting flange 27 of the valance member 20. Illustrated in detail in both FIGS. 4 and 5, these connecting means include a pair of generally parallel connector flanges 43,44 which define a channel C1 (FIG. 6) therebetween. The upper connector flange 44 is preferably L-shaped so that its lowest vertical point is horizontally offset from the lower connector flange 43. Accordingly, the end of the horizontal mounting flange 27 of the valance member 20 is slidably mounted into this channel C1 wherein it is frictionally engaged and held by the two facing connector flanges 43,44. By this action, the connector flanges 43,44 capture the top portion of the valance member 20 in the vertical plane. Capturing the top portion of the valance member 20 by the connector flanges 43,44 in the horizontal plane is accomplished by the end of the lower connector flange 43 frictionally engaging and pressing against the side of the rib 31 extending downwardly from the mounting flange 27.

The components may be formed of nylon, Delrin (polyoxymethylene), high density polyethylene, polyvinyl chloride, polyethylene or the like. Thus, when the upper connector flange 44 engages the upper surface of the mounting flange 27, the upper connector flange deflects a small amount to bias the mounting flange against the lower connector flange 43, which engages both the lower surface 28 and the rib 31 of the mounting flange, so that the mounting flange is resiliently gripped both horizontally and vertically therebetween.

While the top portion of the valance member 20 is gripped by the corner member 40, the bottom portion of the valance member 20 interlocks with the bottom portion 55 of the corner member. Specifically, cantilevered portion 33 projecting from the bottom edge 24 and rear surface 26 of the valance member 20 forms a channel C2 substantially parallel the bottom edge and adjacent the rear surface and holds the bottom portion 55 of the end 42 of the corner member 40. By having the channel C2 hold the bottom of the corner piece, the valance member 20 will not separate from the corner piece 40. It has been found that if the grip is relatively strong at the top of the members 20,40, it is not necessary to have a strong grip at the bottom of the members. Indeed, preventing a strong grip can make the act of connecting the parts easier to perform. Thus, the valance member 20 and the corner member 40 are releasably interlocked at both their tops and their bottoms.

The corner member 40 further includes a generally arcuate portion 41 that is about 90° that has a first front surface 45 that terminates at marginal ledges 46 that have offset portions 51 forming second front surfaces 52. The ledge 46, offset, and two front surfaces 45,52 can be seen clearly in the side view of the corner member 40 of FIG. 6. The ledges 46 traverse the entire face of the corner member 40 so as to form abutments that prevent the further sliding or movement of the valance members 20 relative to the corner member. By having this construction, when the pieces are releasably connected and the ends 21 of the valance members 20 abut the ledges 46 of the corner member 40, the visible front surfaces 25 of valance members generally lie flush so as to be planar with the visible first front surface 45 of the corner member. This gives a very smooth, uninterrupted appearance to the valance assembly 10 from vantage points in front of and to the side of the assembly. In addition, the second front surfaces 52 of the corner member 40 are not visible from the front of the valance assembly 10 when the pieces are connected; rather, the front surfaces abut the rear surfaces 26 of the valance members 20.

In this side view of FIG. 6, it can also be seen that the connector flanges 43,44 lie in substantially parallel planes that are generally perpendicular to the planes of the first and the second front surfaces 45,52. In this view, the channel, referenced with the designation C1, formed between the upper connector flange 44 and the lower connector flange 43 can be clearly seen. Additionally, the ledges 46, described above, extend upwardly beyond the upper connector flange 44 so as to form an abutting surface on which a cap 60 can be placed.

Caps 60 can be releasably connected to the top, adjacent the top edge of the arcuate portion 41 of the corner member 40, and to the bottom, adjacent the bottom edge of the arcuate portion of the corner member 40. Both caps 60 are shown connected in FIGS. 1 and 2 and the top cap is additionally shown in FIGS. 4-6.

Each cap 60 is identical and has generally planar inner 61 (FIG. 5) and outer surfaces 62 (FIG. 4) and an arcuate outer edge 63 substantially following the contours of the front surfaces 45,52 of the corner member 40. The cap 60 is L-shaped in cross section in that the outer edge 63 has a contiguous cantilevered portion 64 for receiving the cover or decorative panel 90. Thus, when both caps 60 are in place, the decorative panel 90 will be held and maintained in a position that is generally adjacent and parallel to both the first and second front surfaces 45,52 of the corner member 40. FIG. 1, which shows an assembled product, has a panel 90 slid and held in place adjacent the front surfaces 25,45,52 of the entire valance assembly 10 between the cantilevered portions 32 of the valance members 20 and between the cantilevered portions 64 of the caps 60.

To connect the caps 60 to the corner member 40, each cap has two spaced projections 65 (FIG. 4) extending outwardly from its inner surface 61 that mate and cooperate with apertures 66 (FIG. 4) in the corner member. Specifically, for the top cap 60, bosses 67 with apertures 66 are provided on the upper connector flange 44. A bottom piece 53 with apertures 66 therein projects outwardly at the base of the corner member 40. For added stability, the caps 60 have a tab 68 extending outwardly for cooperating with a slot 54 in the bottom piece 53.

Figure 10:
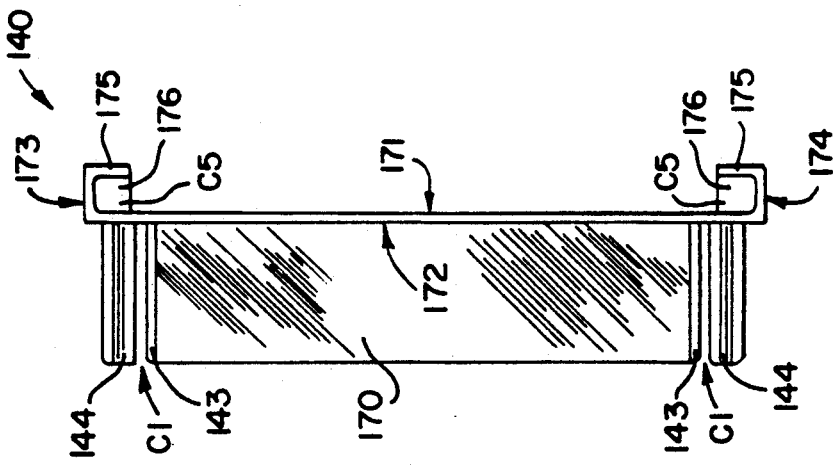
FIG. 10 is a side elevational view of the corner member shown in FIGS. 8 and 9.
Figure 9:
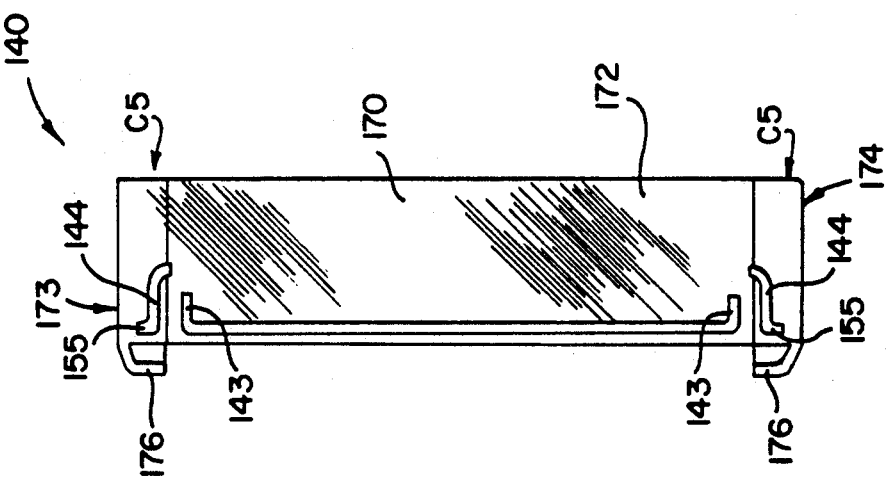
FIG. 9 is a rear elevational view of the corner member shown in FIG. 8.
Figure 8:
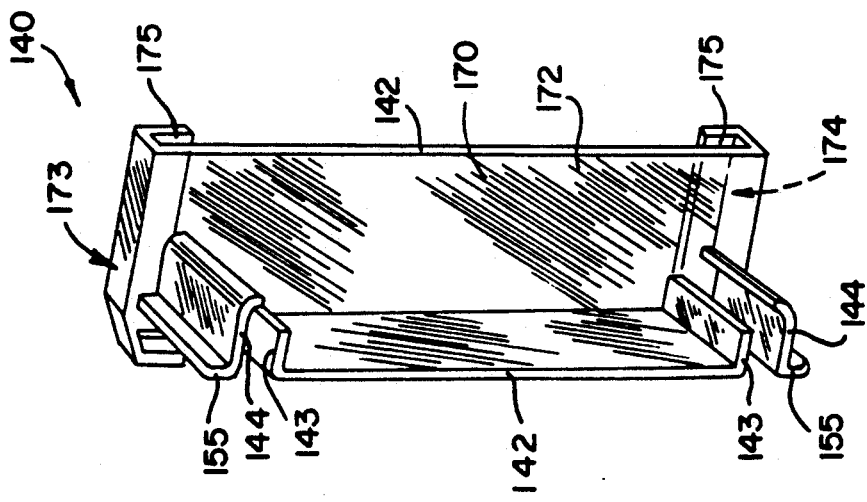
FIG. 8 is a rear perspective view of a second embodiment of a corner member made in accordance with the teachings of the present invention.

A second embodiment of the corner member of the present invention, designated generally by the reference number 140, is shown in FIGS. 8-10. This corner member 140, like the first corner member 40, has opposite ends 142 that extend inwardly, substantially perpendicular to each other, with connection means thereon to releasably connect the valance members such that they, too, are substantially perpendicular to each other. As with the previous embodiment, there is a first connecting means adjacent one of the ends 142 of the corner member 140 for releasable interlocking and gripping an end of the mounting flange 27 and the rib 31 of the valance member 20 shown in FIG. 3. This first connecting means comprises a pair of connector flanges 143,144 that define a channel C1 (FIG. 10) therebetween for receiving one of the ends of the mounting flange 27 slid therein and for frictionally engaging the rib 31 of the valance member 20. The pair of connector flanges 143,144 includes an upper flange 144 and a lower flange 143 for resiliently capturing and gripping the mounting flange 27 in the channel C1 formed therebetween. The upper flange 144 contacts the upper surface 29 of the mounting flange 27 to bias the mounting flange against the lower connector flange 143 so as to permit the lower flange to contact both the lower surface 28 and the rib 31 of the mounting flange. By this action, the lower flange 143 is urged against the side of rib 31 and the top portion of the valance member 20 is held both vertically and horizontally.

There is also a bottom extension 155 for slidably fitting into the channel C2 formed parallel to the bottom edge 24 and adjacent the rear surface 26 by the cantilevered portion 33 of the valance member 20. Thus, when properly slid together, the valance member 20 is secured both at the top and the bottom to the corner member 140.

Figure 7:
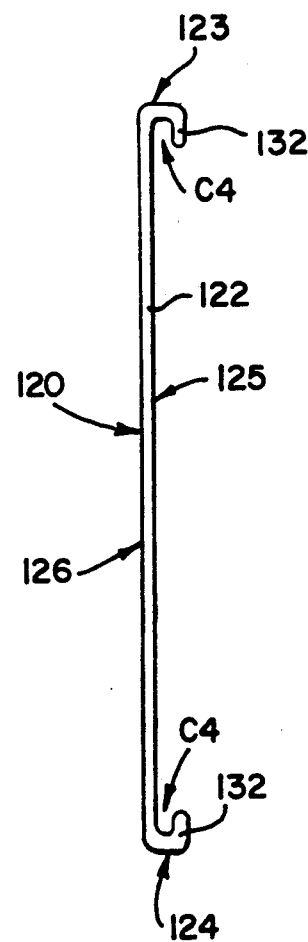
FIG. 7 is an end view of an alternate valance member.

Unlike the previous corner member 40 embodiment which holds two identical valance members 20, the corner member 140 of the present embodiment can hold two different types of valance members 20,120. In particular, adjacent the other end 142 of the second embodiment, there is also means for holding a second valance member in perpendicular relation to the first valance member. The second valance member 120, shown in end view in FIG. 7, is different than the first valance member 20, shown in FIG. 3. This second type of valance member is substantially similar to the first one, but it has no mounting flange and raised rib thereon. Like the first type of valance member, the second type of valance member 120 has a vertical portion 122 that includes a top edge 123, a bottom edge 124, a front surface 125 and a rear surface 126. The front surface 125 and the rear surface 126 are generally planar.

The front surface 125 of the vertical portion 22 may be itself decorative or it may receive a cover 90 in the channels C4 that are formed by the cantilevered portions 132 contiguous with both the top edge 123 and the bottom edge 124. Accordingly, from the end, the valance member 120 looks C-shaped. As with the first valance member 20, the decorative panel 90 can be slid into the channels C4 formed by the cantilevered portions 132 so as to be held generally adjacent and parallel to the front surface 125 of the valance member 120.

The means for holding a second valance member is a face plate 170, that has a front surface 171, a rear surface 172, a top edge 173 and a bottom edge 174. The two generally parallel connector flanges 143,144 project outwardly from this face plate's rear surface 172 in a substantially perpendicular manner. As seen in both FIGS. 8 and 10, cantilevered portions 175 project outwardly from, in a substantially perpendicular manner, the front surface 171 at both the bottom edge 174 and the top edge 173 forming two channels C5 for receiving the second valance 120 slid therein.

An abutment 176 is integral with each cantilevered portion 175 for preventing the further sliding of the second valance member 120.

Finally, in the preferred embodiment of this second embodiment, there are two pairs of connector flanges 143,144 and two extensions 155. The second pair is a mirror image of the first pair so as to permit the corner piece 140 to interconnect either end 21 of the first valance member 20 and to a second valance member 120. In this manner, two identical corner pieces can be used in assembling the valance member. This saves in construction costs and in stocking replacement parts because one construction is adaptable to either side of the valance assembly 10. The same structure can be used to connect the left end 21 of the front valance member 20 and to connect the right end of the valance assembly. The piece is merely rotated 180 degrees. To accomplish this, the upper flange 144 is generally S-shaped which is the combination of the L-shaped flange (44) of the first embodiment, that has its lowest vertical point horizontally offset from the second connector (43), and the extension portion 155. Thus, the lower extension portion 155 is held by the cantilevered portion 33 extending rearwardly of the bottom edge 24 of the valance 20 when the other, upper pair of connector flanges 143,144 is engaging and gripping the mounting flange 27.

Figure 13:
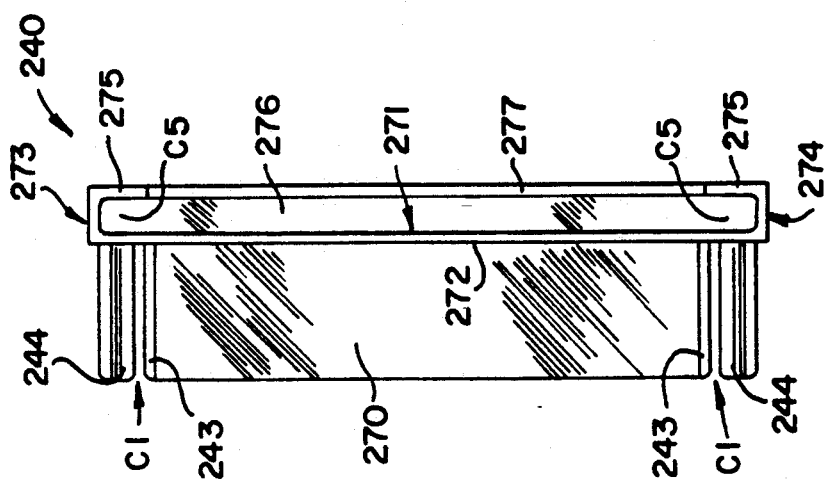
FIG. 13 is a side elevational view of the corner member shown in FIGS. 11 and 12.
Figure 12:
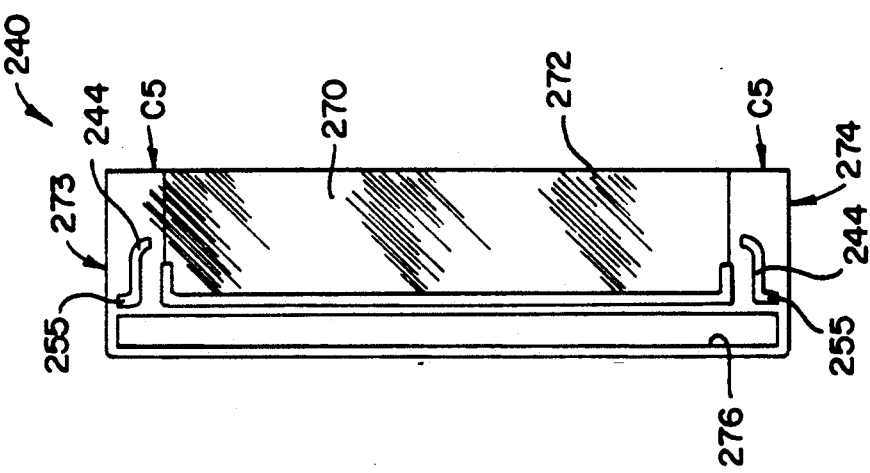
FIG. 12 is a rear elevational view of the corner member shown in FIG. 11.
Figure 11:
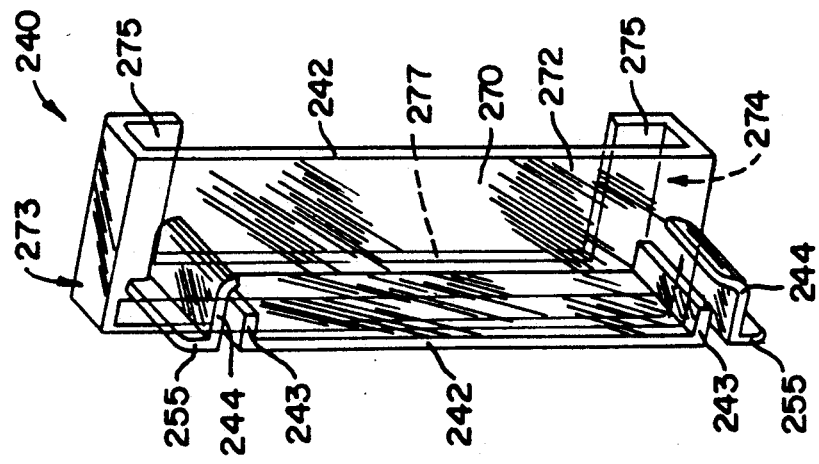
FIG. 11 is a rear perspective view of a third embodiment of a corner member made in accordance with the teachings of the present invention.

A third embodiment of the corner member of the present invention, designated generally by the reference number 240, is FIGS. 11-13. Reference numbers to this embodiment which are directed to elements similar to those identified in the second and first embodiments are the same as those previous reference numbers; however, they are in the 200 series.

This third type of corner member 240, like the preceding two before it, has opposite ends 242 that extend inwardly substantially perpendicular to each other with connection means thereon to releasably connect the valance members such that they, too, are substantially perpendicular to each other. There is a first connecting means adjacent one of the ends 242 of the corner member 140 for releasable interlocking and gripping an end of the mounting flange 27 and the rib 31 of the valance member 20 shown in FIG. 3. The first connecting means comprise a pair of connector flanges 243,244 that define a channel C1 (FIG. 13) therebetween for receiving one of the ends of the mounting flange 27 slid therein and for frictionally engaging the rib 31 of the valance member 20. The pair of connector flanges 243,244 includes an upper flange 244 and a lower flange 243 for resiliently capturing and gripping the mounting flange 27 in the channel C1 formed therebetween. The lower flange contacts both the lower surface 28 and the rib 31 of the mounting flange 27 that are urged against it by the upper flange 144 which contacts the upper surface 29.

There is also a bottom extension 255 for slidably fitting into the channel C2 formed parallel to the bottom edge 24 and adjacent the rear surface 26 by the cantilevered portion 33 of the valance member 20. When slid together, the valance member 20 is thus secured both at the top and the bottom to the corner member 240.

As with the corner member of the second embodiment, the corner member 240 of the present embodiment can hold two different types of valance members 20,120. In particular, adjacent the other end 242, there is means for holding a second valance member 120, like the one showed in FIG. 7, in perpendicular relation to the first valance member 20, which is shown in FIG. 3. The means for holding a second valance member 120 is a face plate 270, that has a front surface 271, a rear surface 272, a top edge 273 and a bottom edge 274. The two connector flanges 243,244 project substantially perpendicular outwardly from the rear surface 272 of the face plate. As seen in both FIGS. 11 and 13, cantilevered portions 275 project substantially perpendicular outwardly from the front surface 271 at both the bottom edge 274 and the top edge 273 forming two channels C5 for receiving the second valance 120 slid therein.

An abutment 276 is integral with each cantilevered portion 275 for preventing the further sliding of the second valance member 120. For further strength and aesthetics, a cross member 277 connects both the cantilevered portions 275 and abutments 276. This cross member 277 is substantially parallel to the front surface 271 of the face plate 270.

In the preferred embodiment of this third embodiment, there are two pairs of connector flanges 243,244 and two extensions 255. The second pair is a substantial mirror image of the first pair so as to permit the corner piece 240 to interconnect either end 21 of the first valance member 20 and to the second valance member 120. In this manner, two identical corner pieces can be used in assembling the valance assembly.

Finally, with respect to materials and coloring, it was noted previously that the components of the valance assembly can be formed of nylon, Delrin (polyoxymethylene), high density polyethylene, polyvinyl chloride, polyethylene or the like. The valance members can be clear or opaque and they can have a decorative design thereon or hold a decorative panel if desired by the consumer. In practice, the corner members of the first embodiment are colored and opaque and the corner members of the second and third embodiments are clear. In this manner, if no decorative panel is used in the valance assembly, it will appear pleasing to the viewer and joints or connections will not visibly stand out.

I claim:

1. A corner member for interlocking two valance members in an angled relation to each other,
   one valance member having opposite ends and a vertical portion with a top edge, a bottom edge, a front surface and a rear surface,
   the valance rear surface having a horizontal mounting flange spaced from and substantially parallel to the valance top edge integral therewith and extending generally perpendicular from the rear surface,
   the valance mounting flange being disposed in a generally perpendicular relation to the rear surface of the valance member and having a raised rib projecting downwardly from a lower surface extending along substantially the full length of the mounting flange in parallel predetermined spaced relation to the rear surface, and
   the bottom edge having a cantilevered portion projecting rearwardly from the valance member forming a first channel adjacent the rear surface comprising:
   a front surface, a back surface, a top edge, a bottom edge, a first end and a second end, said first end having a generally vertical leading edge,
   first connecting means projecting outwardly away from said back surface adjacent said first end of the corner member for releasable interlocking with an end of the mounting flange,
   said first connecting means being adjacent said top edge of the corner member and including a first pair of connector flanges defining a second channel therebetween adapted to slidably receive an end of the mounting flange with one said connector flange frictionally engaging the rib, said first pair of connector flanges including a generally L-shaped upper connector flange and a generally flat lower connector flange adapted to resiliently capture the mounting flange therebetween,
   said upper connector flange being wider than said lower connector flange and being adapted to engage an upper surface of the mounting flange in a manner to bias the mounting flange against said lower connector flange,
   said lower connector flange being adapted to frictionally engage both the lower surface and the rib of the mounting flange,
   a vertical stem adjacent said bottom edge of the corner member co-linear with said vertical leading edge adapted to slidably fit in the first channel, said vertical stem being an extension of a second pair of connector flanges,
   said second pair of connector flanges being a mirror image of said first pair of connector flanges with said first pair of connector flanges having a second extension adjacent said top edge of the corner member co-linear with said vertical leading edge adapted to permit the corner member to interconnect either end of the one valance member to the other valance member, and
   second connection means for holding the other valance member in a perpendicular relation to the one valance member,
   said second connection means being a face plate having a front surface, rear surface, top edge and bottom edge with said first pair and second pair of connector flanges projecting outwardly in a substantially perpendicular manner from said rear surface, said bottom edge and said top edge of said face plate further having cantilevered portions projecting outwardly therefrom forming a third channel and a fourth channel for slidably receiving said other valance member.

2. A corner member for interlocking two valance members in an angled relation to each other,
   each valance member having opposite ends and a vertical portion with a top edge, a bottom edge, a front surface and a rear surface,
   the valance rear surface having a horizontal mounting flange spaced from and substantially parallel to the valance top edge integral therewith and extending generally perpendicular from the rear surface,
   the valance mounting flange being disposed in a generally perpendicular relation to the rear surface of the valance member and having a raised rib projecting downwardly from a lower surface extending along substantially the full length of the mounting flange in parallel predetermined spaced relation to the rear surface, and
   the bottom edge having a cantilevered portion projecting rearwardly from the valance member forming a first channel adjacent the rear surface, comprising:
   a front surface, a back surface, a first end and a second end, said first end having a generally vertical leading edge,
   connecting means projecting outwardly away from said back surface adjacent each said end of the corner member for releasable interlocking with an end of the mounting flange,
   said connecting means including a pair of generally parallel connector flanges defining a second channel therebetween adapted to slidably receive an end of the mounting flange with said pair of connector flanges capturing in both a horizontal and a vertical direction the mounting flange so as to effectuate said releasable interlock,
   said pair of connector flanges including a generally L-shaped upper flange and a generally flat lower flange adapted to capture the mounting flange therebetween,
   said upper flange being wider than said lower flange and being adapted to engage an upper surface of the mounting flange in a manner to bias the mounting flange against said lower flange,
   said lower flange being adapted to frictionally engage both the lower surface and the rib of the mounting flange, and a bottom stem co-linear with said vertical leading edge to slidably fit int he first channel of the valance member, said corner member being generally arcuate and the valance members releasably connected thereto being releasably interlocked substantially perpendicular to each other.

3. A corner member for interlocking two valance members in an angled relation to each other, each valance member having opposite ends and a vertical portion with a top edge, a bottom edge, a front surface and a rear surface, the valance rear surface having a horizontal mounting flange spaced from and substantially parallel to the valance top edge integral therewith and extending generally perpendicular from the rear surface, the valance mounting flange being disposed in a generally perpendicular relation to the rear surface of the valance member and having a raised rib projecting downwardly from a lower surface extending along substantially the full length of the mounting flange in parallel predetermined spaced relation to the rear surface, and the bottom edge having a cantilevered portion projecting rearwardly from the valance member forming a first channel adjacent the rear surface, comprising:

a front surface, a back surface, a first end and a second end, said first end having a generally vertical leading edge, connecting means projecting outwardly away from said back surface adjacent each said end of the corner member for releasable interlocking with an end of the mounting flange, said connecting means including a pair of generally parallel connector flanges defining a second channel therebetween adapted to slidably receive an end of the mounting flange with said pair of connector flanges capturing in both a horizontal and a vertical direction the mounting flange so as to effectuate said releasable interlock, said pair of connector flanges including a generally L-shaped upper flange and a generally flat lower flange adapted to capture the mounting flange therebetween, said upper flange being wider than said lower flange and being adapted to engage an upper surface of the mounting flange in a manner to bias the mounting flange against said lower flange, said lower flange being adapted to frictionally engage both the lower surface and the rib of the mounting flange, and a bottom stem co-linear with said vertical leading edge to slidably fit int he first channel of the valance member, said corner member having a generally arcuate portion having a first front surface terminating at marginal ledges that have offset portions with bottom segments and with a second front surface adapted to permit the front surface of the interconnected valance members to be flush with said first front surface, and said pair of connector flanges lying in substantially parallel planes that are generally perpendicular to a plane comprising said first and said second front surfaces.

4. The corner member as defined in claim 3 wherein said corner member has an upper cap releasably connected thereto adjacent said top edge thereof and a lower cap releasably connected thereto adjacent said bottom segments thereof, each said cap having generally planar inner and outer surfaces and an arcuate outer edge substantially following the contours of said front surfaces of said corner member, said outer edge of said cap further having a contiguous cantilevered portion for receiving and maintaining said cover in a position generally adjacent and parallel to said front surfaces of said corner member.

5. The corner member as defined in claim 4 wherein each said cap has a projection extending outwardly from said inner surface, said upper flange has an aperture therein for cooperating with said cap projection, and said bottom edge has an inwardly extending flange with an aperture therein for cooperating with said cap projection.

6. The corner member as defined in claim 4 wherein each said cap has a plurality of projections extending outwardly from said inner surface, said upper flange has a plurality of bosses with apertures therein for cooperating with said cap projections, and said bottom edge has an inwardly extending bottom piece with a plurality of apertures therein for cooperating with said cap projections.

7. The corner member as defined in claim 6 wherein said bottom piece has a slot and each said cap has a tab for mating with said slot.

* * * * *